(12) United States Patent
Desclos et al.

(10) Patent No.: US 9,037,190 B2
(45) Date of Patent: May 19, 2015

(54) ADAPTIVE REPEATER FOR IMPROVED COMMUNICATION SYSTEM PERFORMANCE

(75) Inventors: Laurent Desclos, San Diego, CA (US); Sebastian Rowson, San Diego, CA (US); Jeffrey Shamblin, San Marcos, CA (US); Alexandre Dupuy, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 230 days.

(21) Appl. No.: 13/523,687

(22) Filed: Jun. 14, 2012

(65) Prior Publication Data

US 2013/0149957 A1     Jun. 13, 2013

Related U.S. Application Data

(60) Provisional application No. 61/496,847, filed on Jun. 14, 2011.

(51) Int. Cl.
*H04M 1/00* (2006.01)
*H04B 7/15* (2006.01)
*H04B 7/155* (2006.01)

(52) U.S. Cl.
CPC .............. *H04B 7/15* (2013.01); *H04B 7/15535* (2013.01)

(58) Field of Classification Search
USPC .................... 455/553.1, 550.1, 552.1, 7–11.1
See application file for complete search history.

(56) References Cited

U.S. PATENT DOCUMENTS

| | | | | |
|---|---|---|---|---|
| 2002/0045461 | A1* | 4/2002 | Bongfeldt | 455/522 |
| 2007/0066220 | A1* | 3/2007 | Proctor et al. | 455/11.1 |
| 2011/0312269 | A1* | 12/2011 | Judd et al. | 455/11.1 |
| 2014/0127989 | A1* | 5/2014 | Judd et al. | 455/24 |
| 2014/0134943 | A1* | 5/2014 | Hobbs et al. | 455/9 |

* cited by examiner

*Primary Examiner* — Fayyaz Alam
(74) *Attorney, Agent, or Firm* — Coastal Patent Law Group, P.C.

(57) ABSTRACT

A dynamically tuned repeater system for improved communication system performance is disclosed. The repeater circuit consists of power amplifiers, low noise amplifiers, filters, switches and antennas along with tuning circuits integrated and controlled to provide an optimized system for RF transmission improvement. Dynamic tuning provides the ability to maintain optimized system performance as required by communication link characteristics. Inputs from proximity sensors are used to further optimize system performance. The repeater topology is capable of transmission and reception enhancement at a multitude of frequency bands.

22 Claims, 15 Drawing Sheets

ADAPTIVE REPEATER FOR IMPROVED COMMUNICATION SYSTEM PERFORMANCE

CROSS-REFERENCE TO RELATED APPLICATIONS

This application claims benefit of priority to U.S. Provisional Application Ser. No. 61/496,847, filed Jun. 14, 2011.

FIELD OF INVENTION

The present invention relates to mobile communication devices; and more particularly to an adaptive transceiver and antenna system adapted to couple with a wireless communication device for enhancing communication link performance.

BACKGROUND OF THE INVENTION

As wireless technology advances toward more versatile mobile platforms, consumer demands within the wireless industry continue to drive convergence in the end mobile device. For example, mobile wireless devices and related equipment are trending toward a single mobile wireless platform, or system concept, effectively enabling system users to operate any single device over a wide range of communication platforms such as voice, data transmission, texting, multimedia video downloads, and other processing functions. Requirements of such multi-functional devices across diverse platforms, especially where these devices may be coupled to multiple accessories, will place additional strain on maintaining antenna performance from the embedded antennas in the mobile device.

Accordingly, there is a present demand for new techniques adapted to maintain antenna system performance, and further adapting the antenna system to function in view of changes in the operational environment of a given wireless device. Current antenna technology is not robust enough to provide the flexibility in optimization and re-tuning required as a mobile wireless device is coupled to other accessories designed to enhance the input and output functions desired by users to make the user experience more efficient. There further remains a need for improving power management and optimizing battery resources within communications devices.

A common problem encountered in mobile wireless communication systems is the de-tuning effects incurred on the antenna due to the multiple use cases for the device, such as for example: device held in the user's hand, device against the user's head, or placement of the device on a surface such as a table or dashboard of an automobile, etc. As the antenna de-tunes, the impedance presented by the antenna to a power amplifier and receiver varies, which in turn reduces the power transfer through the front end (power amplifier, switch assembly, filters, and antenna). The result is reduced communication range as well as reduced data rate for the communication device. With a passive antenna and fixed impedance matching circuit, the front end can only be optimized for a single use case. The added requirement for the mobile wireless device to operate when connected to or in close proximity to additional accessories presents additional challenges in maintaining optimization of the antenna system.

SUMMARY OF THE INVENTION

Accordingly, it is an object of the present invention to solve these and other problems in the art by introducing an adaptive transceiver and antenna system for coupling to one or more embedded antennas within a mobile wireless device and improving both transmit and receive performance of the mobile wireless device when the device is coupled to, or attached to, one or more accessories.

In keeping with these and other objectives, an improved front end circuit design is provided, wherein an adaptive transceiver is adapted to boost both transmitted and received signal levels for providing enhanced signal and efficiency in the communications link In one embodiment of the present invention an adaptive transceiver is integrated into a host device. The host device can be any type of accessory that can at least partially receive, or attach to, a wireless device. In general, a host device may be adapted to expand functionality to the wireless device, such as by providing a larger display or keyboard, improved speakers, additional processors and or memory, etc. The host device can be designed with a docking portion, or receptacle, adapted to at least partially receive, or accept, one or more mobile wireless devices. A coupling antenna is positioned in close proximity for coupling with an embedded antenna of the mobile wireless device, and the coupling antenna is further connected to an adaptive repeater circuit. The output of the repeater circuit is connected to one or more repeating elements integrated into the host device which are used to transmit and receive signals. A band detection and control circuit is used to provide control signals to the power amplifiers and low noise amplifiers within the adaptive repeater circuit. Additionally, the band detection and control circuit may further comprise one or more active tuning components for canceling a reactance of the one or more antennas of the adaptive transceiver system.

In another embodiment, a switch assembly is integrated into the transceiver for bypassing the adaptive repeater circuit. This feature is implemented when an improvement in transmit or receive performance is not required from the adaptive repeater and the repeater can be powered down to reduce power consumption in the host device.

In another embodiment, an algorithm containing power level and power down modes is used to improve performance of the adaptive repeater and wireless device combination. The power level mode increases or decreases one or more of power amplifier gain and low noise amplifier gain depending on the communication link performance required. The power down mode minimizes power consumption of the transmit and receive sections of the repeater system to increase battery life. The power level and power down modes are also used to minimize SAR (specific absorption rate), effectively minimizing radiation exposure levels experienced by a user.

In another embodiment, inputs are collected from proximity sensors within the host device and fed into the detection and control circuit, with these inputs used to optimize transmit and receive performance of the adaptive transceiver. Inputs from proximity sensors or other stimulus are used to sense environmental changes and adjust transmit power to reduce SAR (Specific Absorption Rate) for the total communication system. The total communication system is comprised of the wireless device and host device which contains the adaptive transceiver system.

In yet another embodiment, two or more coupling antennas are positioned to couple to the wireless device inserted into, received by, or connected to, the host device. The coupling antennas provide the ability to couple specific portions of the frequency spectrum and reject other portions. The multiple coupling antennas provide filtering of signals prior to insertion of the signals in the adaptive repeater. In one configuration, low frequency signals such as the 850 MHz GSM band and the 900 MHz EGSM band are coupled through a first coupling antenna while high frequency signals such as the 1800 MHz DCS band, the 1900 MHz PCS band, and the 2100 MHz UMTS band are coupled through a second coupling antenna.

In another configuration, the low frequency band can be separated into receive and transmit portions with separate coupling antennas dedicated to each portion of the frequency band. For example, a first coupling antenna can be configured to have a dual resonance response where the transmit portion of the 850 MHz GSM band, 824 to 849 MHz, and the transmit portion of the 900 MHz EGSM band, 880 to 915 MHz, are covered. A second coupling antenna can be configured to have a dual resonance response where the receive portion of the 850 MHz GSM band, 869 to 894 MHz, and the receive portion of the 900 MHz EGSM band, 925 to 960 MHz, are covered. The concept can be applied to cover multiple transmit or receive bands at the higher frequency bands by designing multi-resonant antennas. One benefit of this technique is to reduce filtering requirements in the adaptive repeater.

In another embodiment, one or more coupling antennas are positioned to couple to the wireless device inserted in, or connected to, the host device. The coupling antennas are connected to the adaptive repeater which is in turn connected to two or more antennas for transmission and reception of signals. The use of two or more antennas connected to the repeater provides an additional degree of optimization in terms of antenna performance as a function of frequency and in improved filtering from the antenna portion of the system. For example, two antennas can be used to separate the low band frequencies in a cellular application, 850 MHz GSM, 900 MHz EGSM, and 700 MHz LTE bands, from the high band frequencies, 1800 MHz DCS, 1900 PCS, 2100 MHz UMTS, and 2600 MHz LTE and WiMax bands. Alternately, four antennas can be used, wherein two antennas are assigned to the low band cellular frequencies and two antennas assigned to the high band frequencies. Additional antennas can be added to continue to segregate the frequency spectrum required from the application into narrow band segments for additional filtering benefits.

BRIEF DESCRIPTION OF THE DRAWINGS

The characteristics and advantages of this invention will be more apparent from the following detailed description when read in conjunction with the accompanying drawings, in which.

DETAILED DESCRIPTION OF THE PREFERRED EMBODIMENTS

Figure 1:
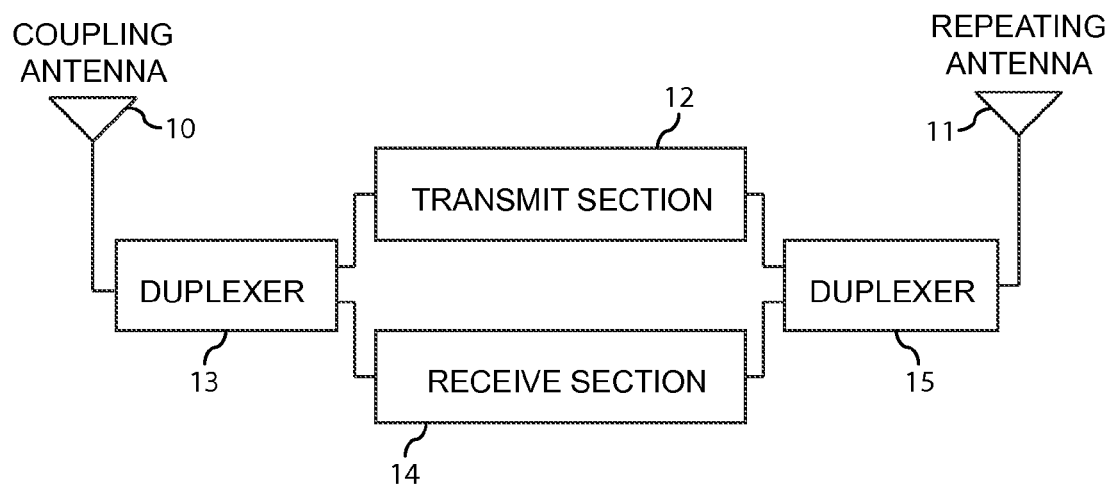
FIG. 1 illustrates a repeater system used to boost transmit and receive signal strength.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention. Certain embodiments will be described below with reference to the drawings wherein illustrative features are denoted by reference numerals.

In a general embodiment of the invention an adaptive transceiver and antenna system, otherwise referred to herein as an adaptive repeater system, is provided within a host device for enhancing communications between a wireless communications device and one or more network base terminals, particularly where the wireless communications device is coupled to the host device or accessory. Examples of a host device may include: a laptop screen and keyboard, video game console, media docking station, or other device adapted to couple with a wireless communications device for providing supplemental features.

The adaptive transceiver and antenna system generally comprises a coupling element for coupling with one or more embedded antennas within the wireless communications device, a repeater circuit comprising a transmit section and a receive section, and a repeating element for communicating with a network base terminal. The system is attached to, or contained within, a host device. The coupling element is positioned in proximity to a dock or port for receiving a wireless communications device for effectuating an electromagnetic coupling therewith.

In addition to enhancing signal characteristics, the adaptive transceiver and antenna system is further adapted to optimize power resources during operation, such as batter power. In certain embodiments, the system is adapted to bypass adaptive circuitry. One or more switches and a bypass transmission line can be used to bypass the adaptive circuitry.

Furthermore, the adaptive transceiver and antenna system is further adapted to enhance performance by reducing signal interferences. In certain embodiments, the system is adapted to split a communications signal into two or more isolated signal components including: high frequency (HF) transmit, HF receive, low frequency (LF) transmit, and LF receive signals. Each of these signal components is the transmitted across a separate transmission section within a repeater circuit, the transmission sections may include transmit, receive, HF, and LF sections. In this regard, each separate transmission section can be further connected to one or more antenna elements.

Still further, the adaptive transceiver and antenna system can be further adapted to enhance a communications signal by incorporating one or more components for preventing unwanted feedback. In this regard, a directional coupler, a Wilkinson power divider, or a hybrid component can be incorporated into the system at a coupling antenna element.

In certain embodiments, a band detection and control circuit is provided. The band detection and control circuit is adapted to actively modulate power between one or more power amplifiers and low noise amplifiers contained within the repeater circuit. The band detection and control circuit can further receive signals from one or more proximity sensors, such that the control circuit is adapted to adjust the overall communications system (host and wireless communications device) for specific absorption rate (SAR) per manufacturer specifications. Additionally, the control circuit may include a memory portion programmed to store one or more algorithms for adjusting repeater circuit parameters, such as power gains and the like. The control circuit provides a means for dynamically adjusting the repeater circuit components and providing enhanced communications performance.

Now turning to the drawings, FIG. 1 illustrates a general repeater system comprising a coupling antenna element 10, a repeating antenna element 11, and a repeater circuit disposed therebetween. The repeater circuit further comprises a transmission section 12 and a receive section 14 disposed between a pair of duplexers 13, 15. The coupling antenna is adapted to couple with at least one embedded antenna of a wireless communications device (not shown) and receive/transmit signals between the wireless communications device and the host device. The repeating element is adapted to receive/transmit signals between a network base transceiver and the host device. The repeater circuit is adapted to enhance and deliver signals between the coupling element and the repeating element. In this regard, the overall communications system is improved for enhanced operation and signal efficiency within a wireless communications network.

Figure 2:
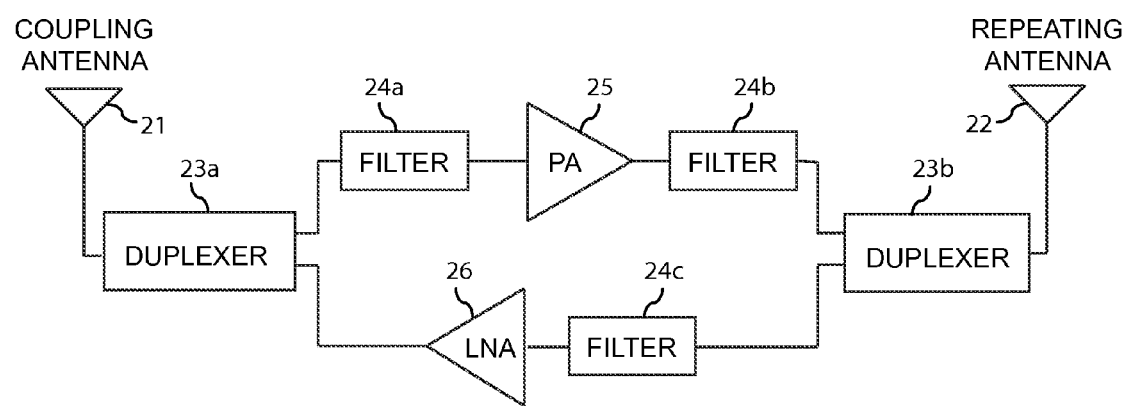
FIG. 2 illustrates a repeater system topology with filters, power amplifier (PA), and low noise amplifier (LNA)

FIG. 2 further illustrates a general repeater system comprising a coupling antenna element 21, a repeating antenna element 22, and a repeater circuit. The repeater circuit further comprises a power amplifier (PA) 25, a low noise amplifier (LNA) 26, and one or more filters 24a-c disposed between a first duplexer 23a positioned at a first end of the repeater circuit and a second duplexer 23b positioned at a second end of the repeater circuit. The duplexers are adapted to separate transmit and receive signals for transmission across respective transmission sections.

Figure 3:
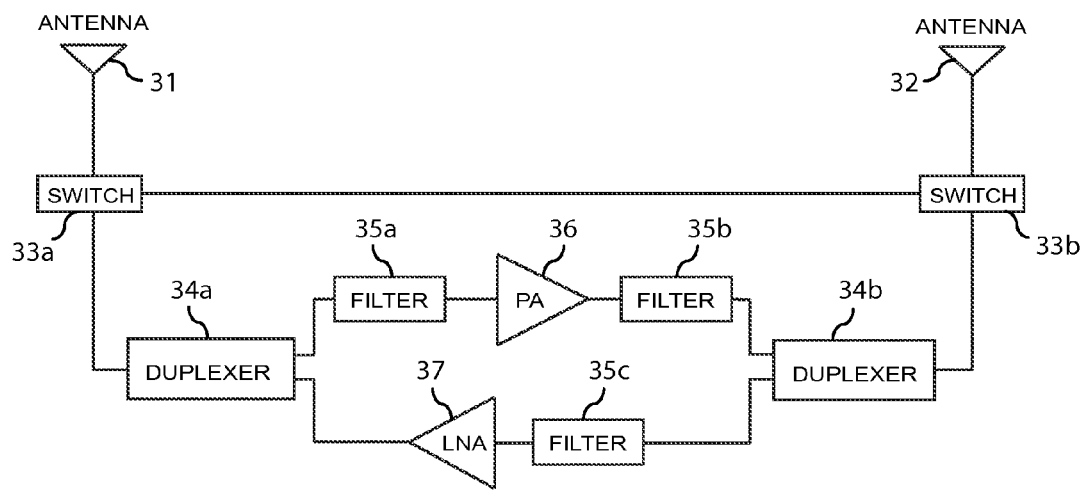
FIG. 3 illustrates a repeater system having incorporated switches to provide the ability to bypass the repeater circuit for reducing power consumption.

FIG. 3 illustrates one embodiment of the invention wherein the repeater system is adapted to electronically isolate the repeater circuit for reducing power consumption. The repeater system comprises a first switch 33a being disposed between a coupling antenna element 31 and a repeater circuit at a first end thereof. A second switch 33b is disposed between a repeating antenna element 32 and the repeater circuit at a second end thereof. A transmission line connects the first and second switches. The switcheably connected repeater circuit further comprises a transmit section and a receive section disposed between a first duplexer 34a and a second duplexer 34b. The first duplexer 34a is further connected to the coupling element 31 at the first switch 33a. The second duplexer 34b is further connected to the repeating element 32 at the second switch 33b. The transmit section further comprises a PA 36 and the receive section of the repeater circuit further comprises a LNA 37. One or both of the transmit and receive sections may further comprise one or more filters, respectively. In this regard, the repeater system is further adapted to bypass the adaptive repeater circuit for reducing power consumption where signal enhancement is not required or where power resources are low (low power mode).

Figure 4:
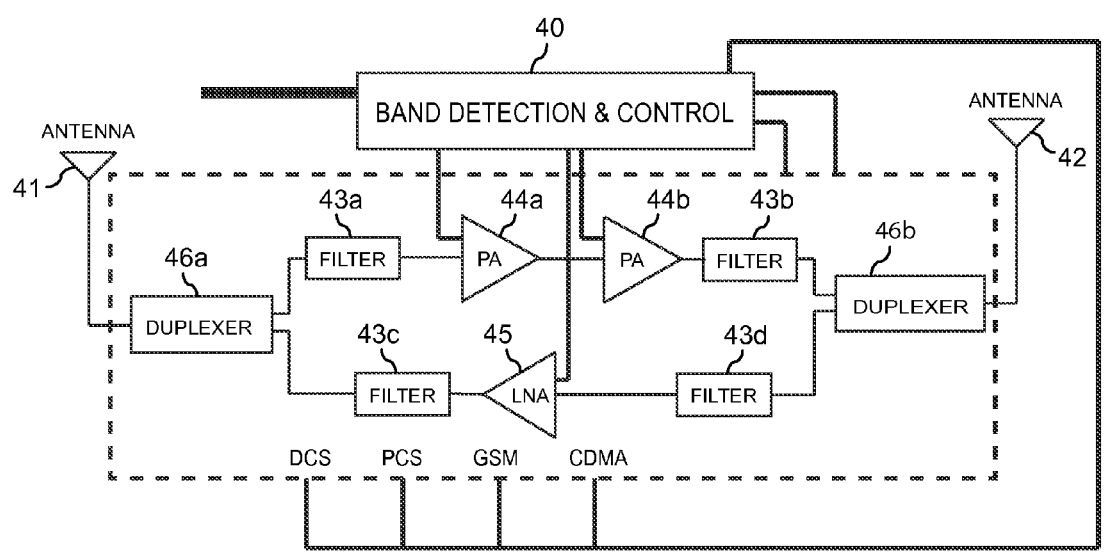
FIG. 4 illustrates an adaptive repeater system with frequency band detection and control circuitry capable of dynamic adjustment of transmit power levels and receive amplification levels.

FIG. 4 is a schematic of an adaptive repeater system according to various embodiments of the invention. The adaptive repeater system comprises a coupling antenna element 41, a repeating antenna element 42, a repeater circuit, and a band detection and control module (BDC module). The repeater circuit further comprises: a transmit section comprising at least one power amplifier 44a-b, a receive section comprising at least one low noise amplifier 45, and one or more filters 43a-d. Each of the transmit and receive sections is disposed between a first duplexer 46a at a first end and a second duplexer 46b at a second end. The first duplexer is further connected to the coupling element, and the second duplexer is further coupled to the repeating element. The BDC module is further connected to one or more power amplifiers and low noise amplifiers of the repeater circuit. In this regard, the BDC module is adapted to dynamically adjust power gain at the one or more power amplifiers and low noise amplifiers connected therewith. The BDC module can further comprise a memory portion programmed with one or more algorithms for operating at various modes. Additionally, the BDC module can dynamically adjust communication characteristics across one or more networks such as DCS, PCS, GSM, and CDMA networks.

Figure 5:
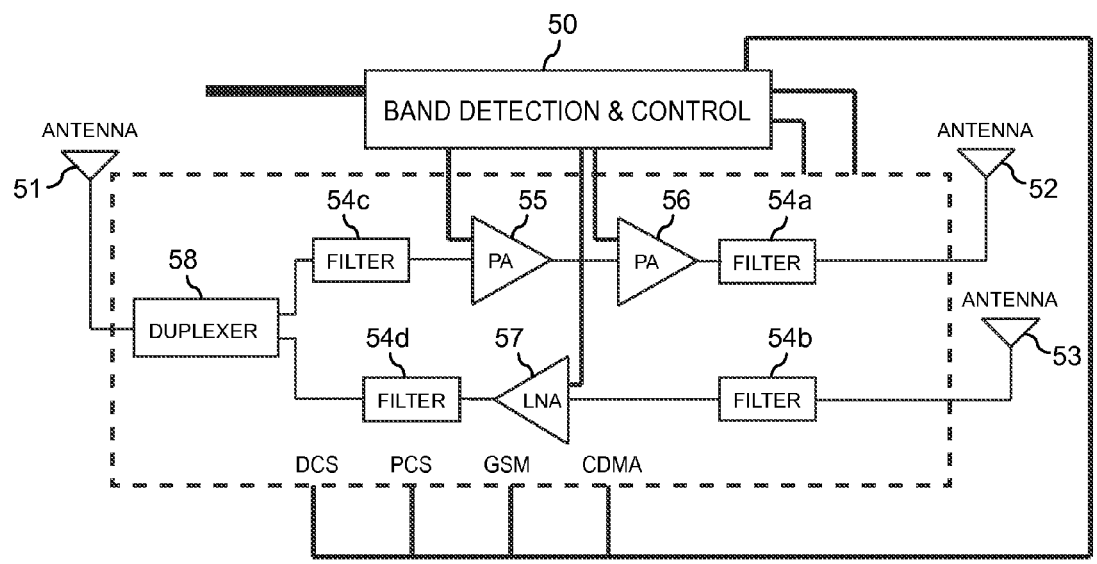
FIG. 5 illustrates an adaptive repeater system with frequency band detection and control circuitry capable of dynamic adjustment of transmit power levels and receive amplification levels, wherein separate transmit and receive antennas are incorporated in the architecture.

FIG. 5 is a schematic of an adaptive repeater system according to certain other embodiments of the invention. The adaptive repeater system comprises a coupling antenna element 51, a first repeating antenna element 52, a second repeating element 53, a repeater circuit, and a band detection and control module (BDC module). The repeater circuit further comprises: a transmit section comprising at least one power amplifier 55-56, a receive section comprising at least one low noise amplifier 57, and one or more filters 54a-d. Each of the transmit and receive sections is disposed between a duplexer 58 at a first end of the repeater circuit and one of the first and second repeating elements connected at a second end. The first duplexer is further connected to the coupling element. The BDC module is further connected to one or more power amplifiers and low noise amplifiers of the repeater circuit. In this regard, the adaptive repeater system is adapted to communicate with a network base transceiver using separate transmit and receive antennas for maintaining isolation in the transmit and receive sections for enhanced communications.

Figure 6:
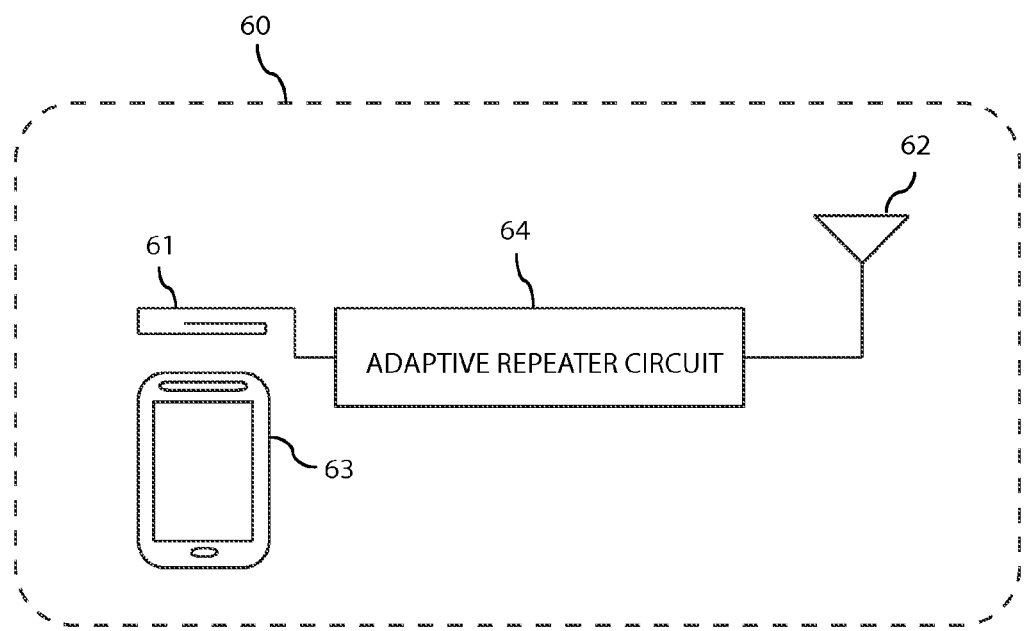
FIG. 6 illustrates a host device having an adaptive transceiver for coupling with a wireless communications device, a coupling element used to couple electromagnetic energy to and from a wireless device for further amplification by the adaptive repeater.

FIG. 6 is a schematic of a general embodiment of the invention wherein a host device 60 comprises an adaptive repeater system. The adaptive repeater system comprises a first coupling element 61 connected to an adaptive repeater circuit 64 such as those disclosed in FIGS. 1-5, and a repeating element 62. The coupling element 61 is positioned adjacent to a coupled wireless communications device 63 such that the coupling element is adapted to couple with one or more embedded antennas of the wireless communications device. In this regard, the host device and electronic components thereof will tend to detune the embedded antennas of the wireless communications device, whereas the repeater system functions to enhance communications signals across the entire communications platform (host and coupled wireless communications device).

Figure 7:
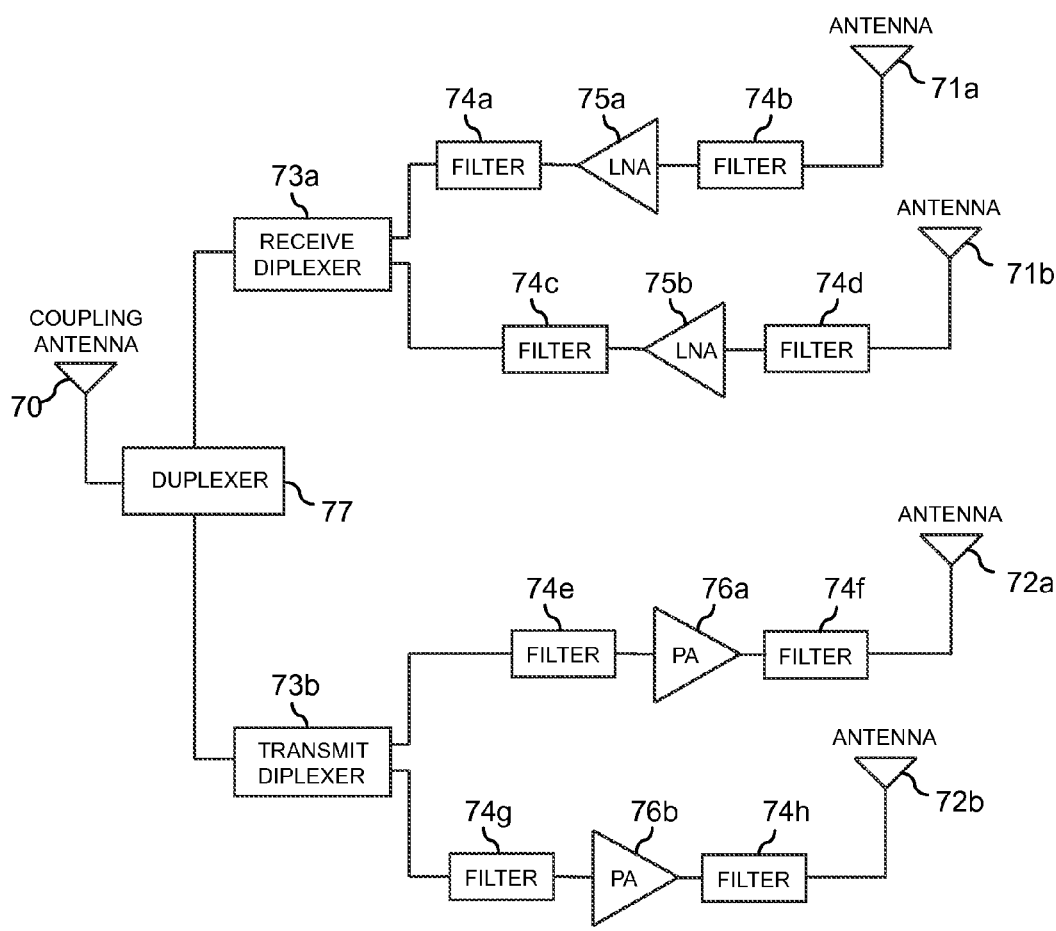
FIG. 7 illustrates a repeater system comprising a single coupling element connected to a diplexer, which in turn is connected to separate transmit and receive sections, wherein pairs of repeating antennas are connected to both transmit and receive circuits for transmission and reception over high and low frequencies.

FIG. 7 illustrates an adaptive repeater system according to various embodiments of the invention wherein the repeater circuit is adapted to isolate transmit and receive signals and further separate low frequency (LF) and high frequency (HF) signal components. The repeater system includes a coupling antenna element 70 connected to a duplexer 77 for isolating transmit and receive components of the communications signal. The duplexer 77 is further connected to a receive diplexer 73a for further separating receive signals into HF and LF components and a transmit diplexer 73b for further separating transmit signals into HF and LF components. The receive diplexer 73a is further connected to a HF receive section comprising a LNA 75a, and a LF receive section comprising a LNA 75b. Each of the receive sections may further comprise one or more filters 74a-d for filtering noise from the transmission lines. The HF receive section is further connected to a HF repeating element 71a and the LF receive section is further connected to a LF repeating element 71b. The transmit diplexer 73b is further connected to a HF transmit section comprising a PA 76a, and a LF transmit section comprising a PA 76b. Each of the transmit sections may further comprise one or more filters 74e-h for filtering noise from the transmission lines. The HF transmit section is further connected to a HF repeating element 72a and the LF transmit section is further connected to a LF repeating element 72b. In this regard, the adaptive repeater system is adapted to isolate HF and LF transmit signals as well as HF and LF receive signals for maintaining isolation within the repeater circuit and providing improved communications performance.

Figure 8:
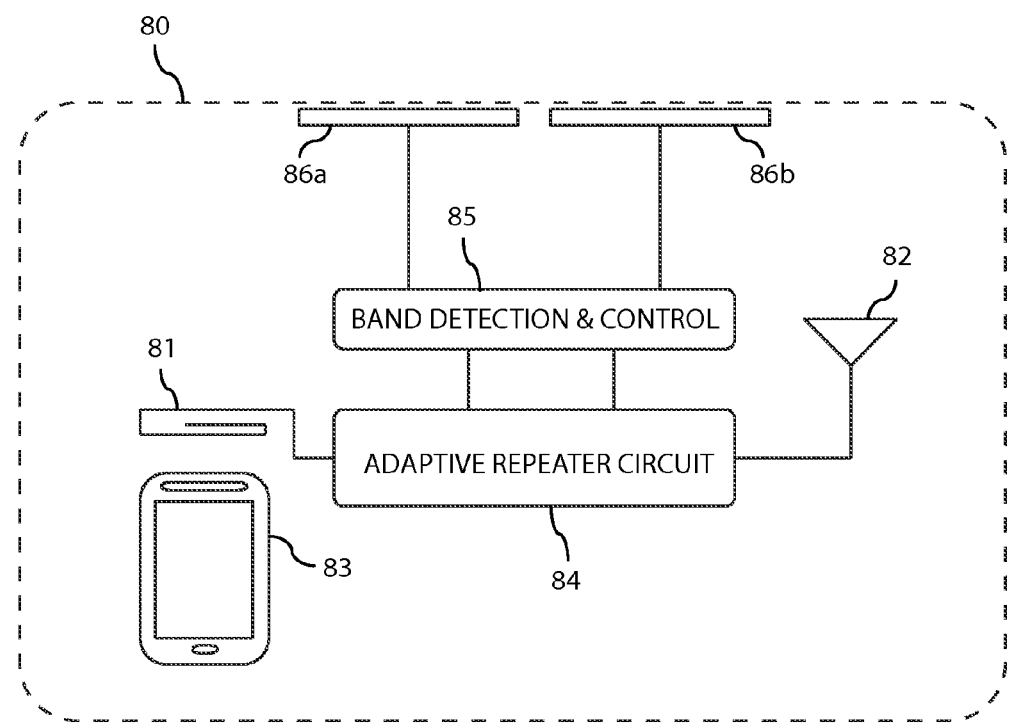
FIG. 8 illustrates an adaptive transceiver with a band selection and control circuit connected to proximity sensors to aid in optimization of transmit and receive characteristics of the system.

FIG. 8 is a schematic representation of certain embodiments of the invention wherein one or more proximity sensors may be incorporated into the system for sensing various device modes, such as device to head, device on dashboard, device in hand, and others. A host device 80 comprises an adaptive repeater system for enhancing communications link performance with a coupled wireless communications device 83. The adaptive repeater system comprises a coupling element 81 adapted to couple with one or more embedded antennas of the wireless communications device 83, the coupling element being connected to an adaptive repeater circuit 84. The adaptive repeater circuit 84 is further connected to a repeating element 82 and a band detection and control circuit (BDC circuit) 85. One or more proximity sensors 86a-b may be connected to the BDC circuit for determining one or more device modes and adjusting for SAR and HAC requirements. The BDC circuit can be provided in module form, wherein a BDC module is adapted to detect the band of operation, dynamically adjust the repeater circuit for signal enhancement, and determine a device mode for adjusting SAR and HAC.

Figure 9:
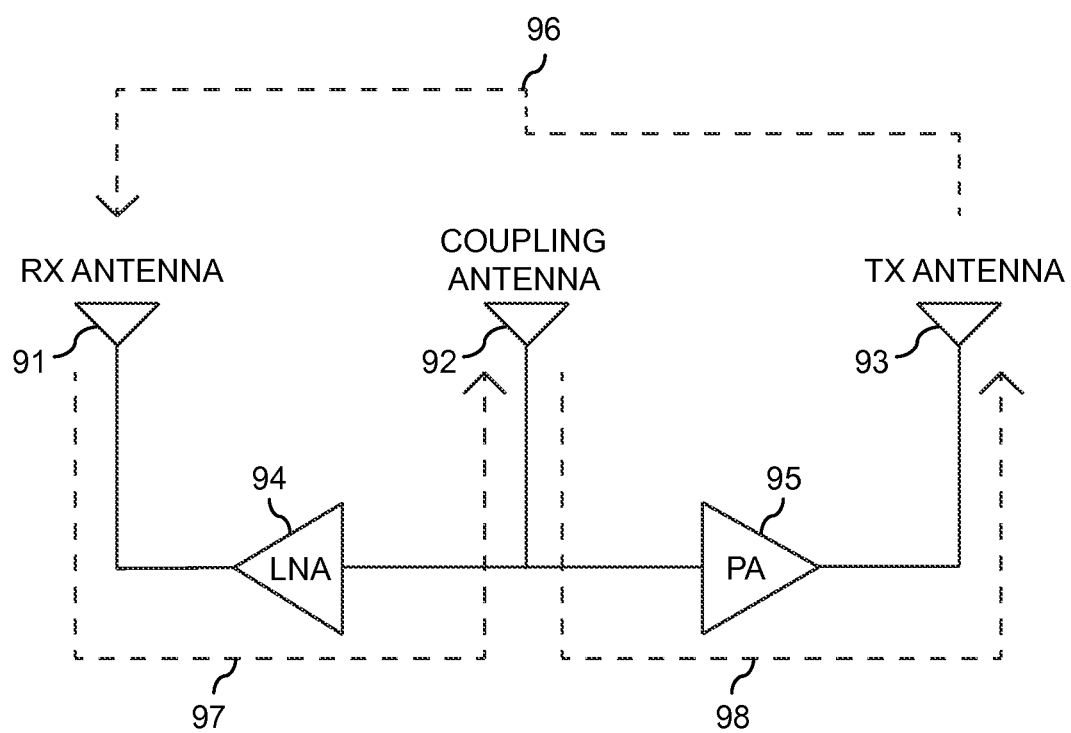
FIG. 9 illustrates a common problem encountered when a single coupling antenna is used to couple the wireless device to be amplified to the transmit and receive circuits of the transceiver.

FIG. 9 illustrates a problem recognized with providing a coupling antenna 92 to separate transmit and receive sections. The coupling antenna 92 is connected to a receive section comprising a LNA 94 and a receive antenna 91. The coupling antenna 92 is further connected to a transmit section comprising a PA 95 and a transmit antenna 93. The transmit and receive sections tend to couple with the coupling element 97, 98 and themselves 96, causing unwanted feedback. The lack of isolation between transmit and receive circuits tends to reduce antenna efficiency and performance, thus a solution should be addressed for optimizing performance of the system.

Figure 10:
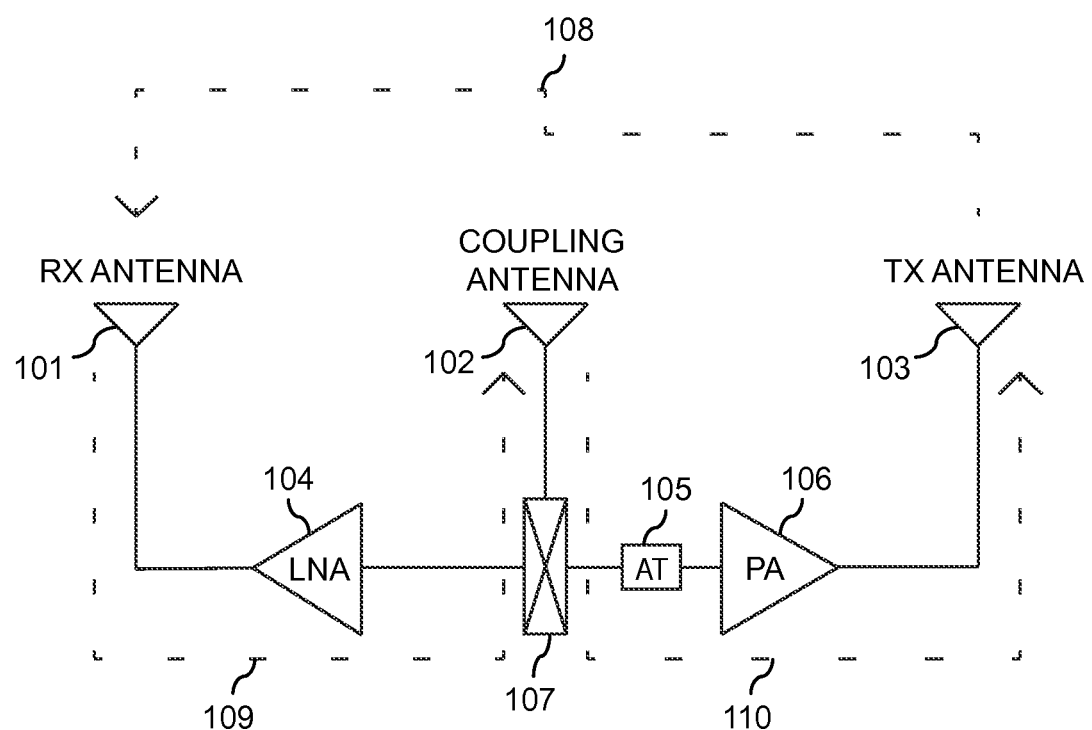
FIG. 10 illustrates a solution to the problem exhibited in FIG. 9, wherein a directional coupler, Wilkinson power divider, or hybrid thereof is used to connect the common coupling antenna to both transmit and receiver circuits, providing the necessary isolation between the circuits.

FIG. 10 illustrates one solution to the problem described in FIG. 9 (above). The repeater system includes a coupling antenna 102 connected to one of a directional coupler, Wilkinson power divider, or a hybrid isolation component, which is further connected to a transmit section and a receive section. The transmit section comprises an attenuator 105, power amplifier 106, and transmit antenna 103. The receive section comprises a low noise amplifier 104 and a receive antenna. Feedback 109 between the receive antenna and coupling antenna, feedback 110 between the transmit antenna and coupling antenna, and feedback 108 between the receive and transmit antennas is substantially reduced with the isolation of the transmit and receive sections.

Figure 11:
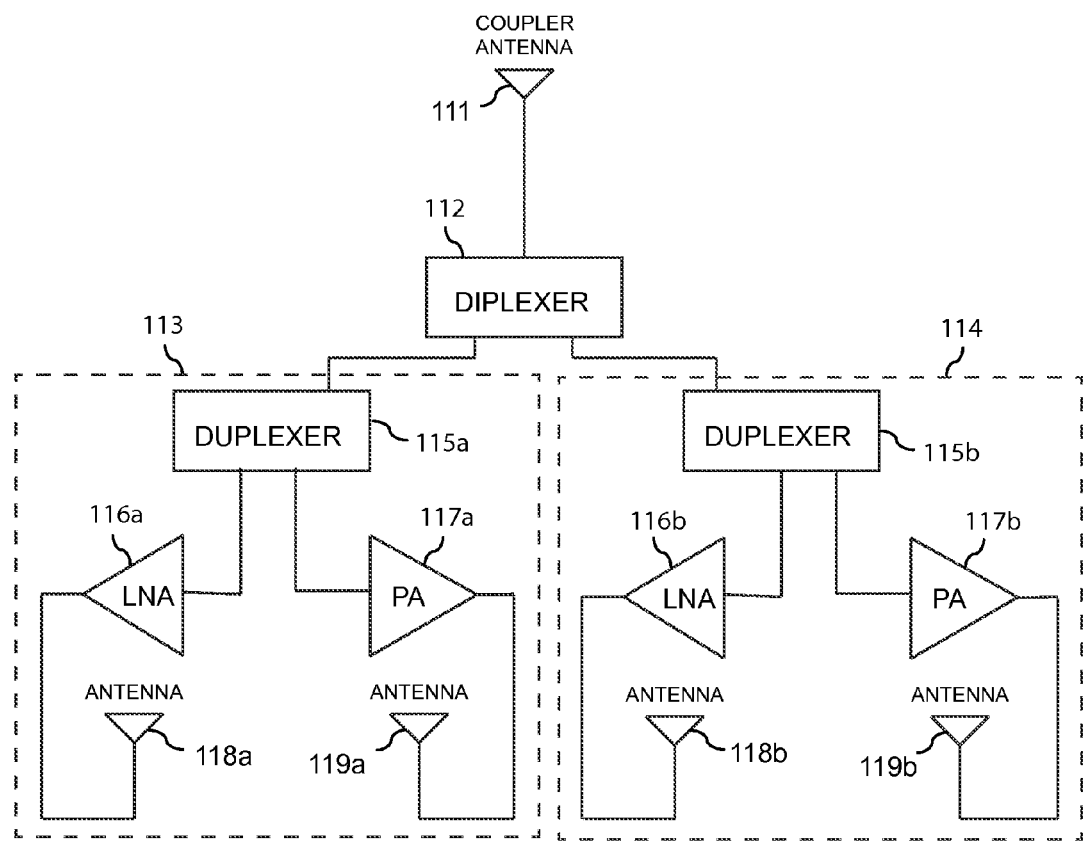
FIG. 11 illustrates a circuit topology incorporating a diplexer and pair of duplexers to split the transmit and receive bands into low frequency and high frequency portions to effectively couple transmit/receive signals to four antennas for re-transmission/reception while providing isolation between the circuits.

FIG. 11 illustrates another example of an adaptive repeater system according to certain embodiments of the invention wherein the coupled signal is separated into low HF and LF signal components. The system comprises a coupling antenna 111 connected to a diplexer 112 for splitting HF and LF frequency components. The diplexer is further connected to a HF section 113 and a LF section 114. The HF section comprises a duplexer 115a connected to a HF transmit section and a HF receive section. The HF transmit section comprises a power amplifier 117a and a HF transmit repeating element 119a. The HF receive section comprises a low noise amplifier 116a and a HF receive repeating element 118a. The LF section comprises a duplexer 115b connected to a LF transmit section and a LF receive section. The LF transmit section comprises a power amplifier 117b and a LF transmit repeating element 119b. The LF receive section comprises a low noise amplifier 116b and a LF receive repeating element 118b. The HF and LF transmit and receive sections are isolated for providing reduced interference and improved performance of the overall communications system.

Figure 12:
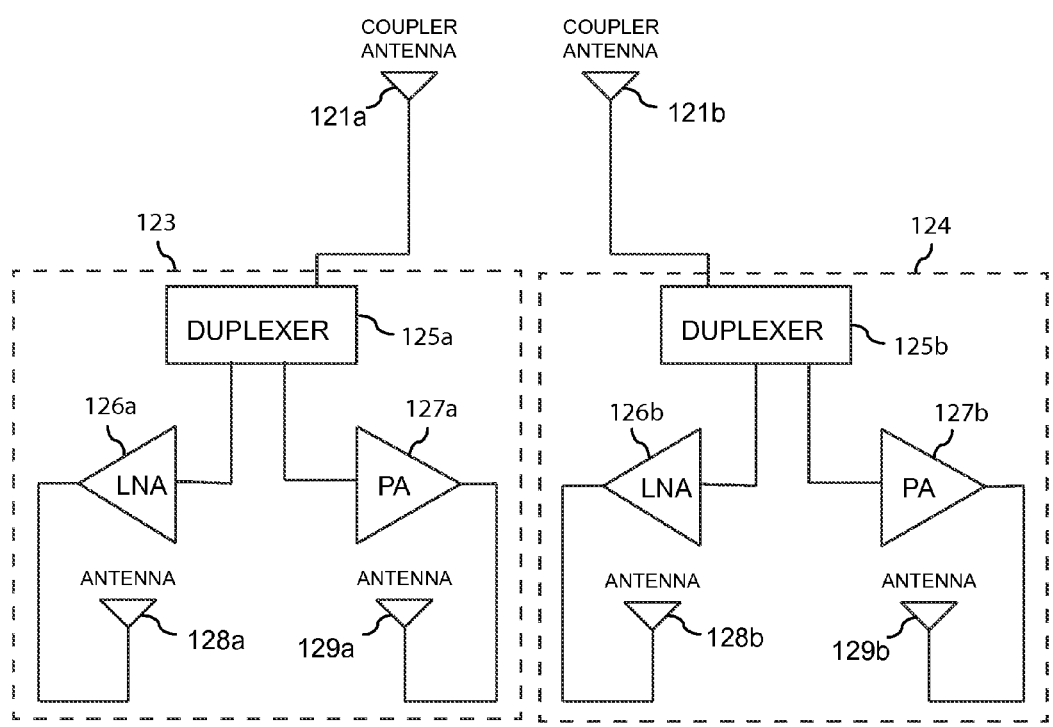
FIG. 12 illustrates a circuit topology incorporating two coupling antennas and a pair of duplexers to separate low and high band signals for efficient transmission and reception from the repeater circuit, wherein four repeating elements are used at the output of the adaptive repeater circuit to transmit at low band and high band, and receive at low band and high band, respectively.

FIG. 12 illustrates another example of an adaptive repeater system according to certain embodiments of the invention wherein the coupled signal is separated into low HF and LF signal components. The system comprises a first coupling antenna 121a tuned for HF reception/transmission and a second coupling antenna 121b tuned for LF reception/transmission. The first coupling antenna 121a is connected to a HF section 123 comprising a first duplexer 125a connected to a HF transmit section and a HF receive section. The HF transmit section comprises a power amplifier 127a and a HF transmit element 129a. The HF receive section comprises a low noise amplifier 126a connected to a HF receive element 128a. The second coupling antenna 121b is connected to a LF section 124 comprising a first duplexer 125b connected to a LF transmit section and a LF receive section. The LF transmit section comprises a power amplifier 127b and a LF transmit element 129b. The LF receive section comprises a low noise amplifier 126b connected to a LF receive element 128b. In this regard, the HF and LF transmit and receive sections are isolated for improved antenna performance.

Figure 13:
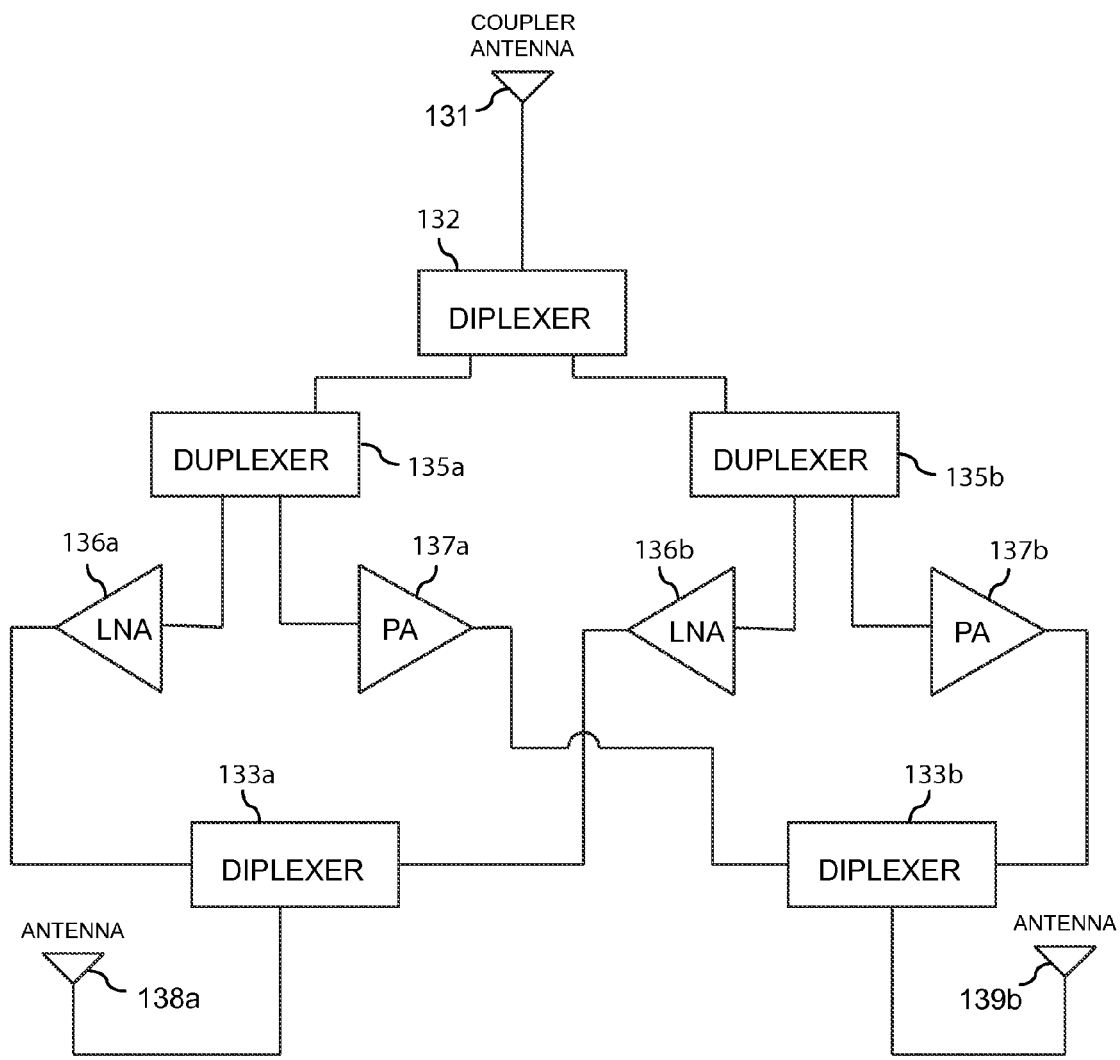
FIG. 13 illustrates a circuit topology incorporating a single coupling antenna and single diplexer and pair of duplexers to separate low and high band signals for efficient transmission and reception from the repeater circuit, wherein two antennas are used at the output of the adaptive repeater circuit to transmit at low band and high band, and receive at low band and high band, respectively, and further wherein a pair of diplexers are incorporated at a second end of the repeater circuit.

FIG. 13 illustrates another adaptive repeater system according to certain embodiments of the invention wherein a dual resonance coupling element is connected to a repeater circuit adapted for isolation of HF and LF transmit and receive sections, the repeater circuit being further connected to a dual resonance transmit antenna and a dual resonance receive antenna. Each of the dual resonance antennas are configured to operate at a LF band and a HF band. The system comprises a dual resonance coupling antenna 131 connected to a diplexer 132 for isolating HF and LF signal components. The diplexer 132 is further connected to a first HF duplexer 135a for isolation of HF transmit and HF receive signal components. The first HF duplexer 135a is further connected to a HF receive section and a HF transmit section. The HF receive section comprises a LNA 136a. The HF transmit section comprises a PA 137a. The diplexer 132 is further connected to a second LF duplexer 135b. The LF duplexer is connected to a LF transmit section and a LF receive section. The LF transmit section comprises a PA 137b. The LF receive section comprises a LNA 136b. The HF and LF transmit sections are combined at transmit diplexer 133b, which is further connected to dual resonance transmit antenna 139b. he HF and LF receive sections are combined at receive diplexer 133a, which is further connected to dual resonance receive antenna 138a. In this regard, isolation is maintained for improved performance while reduced space is realized with only three antennas, each of the antennas being adapted for dual resonance operation.

Figure 14:
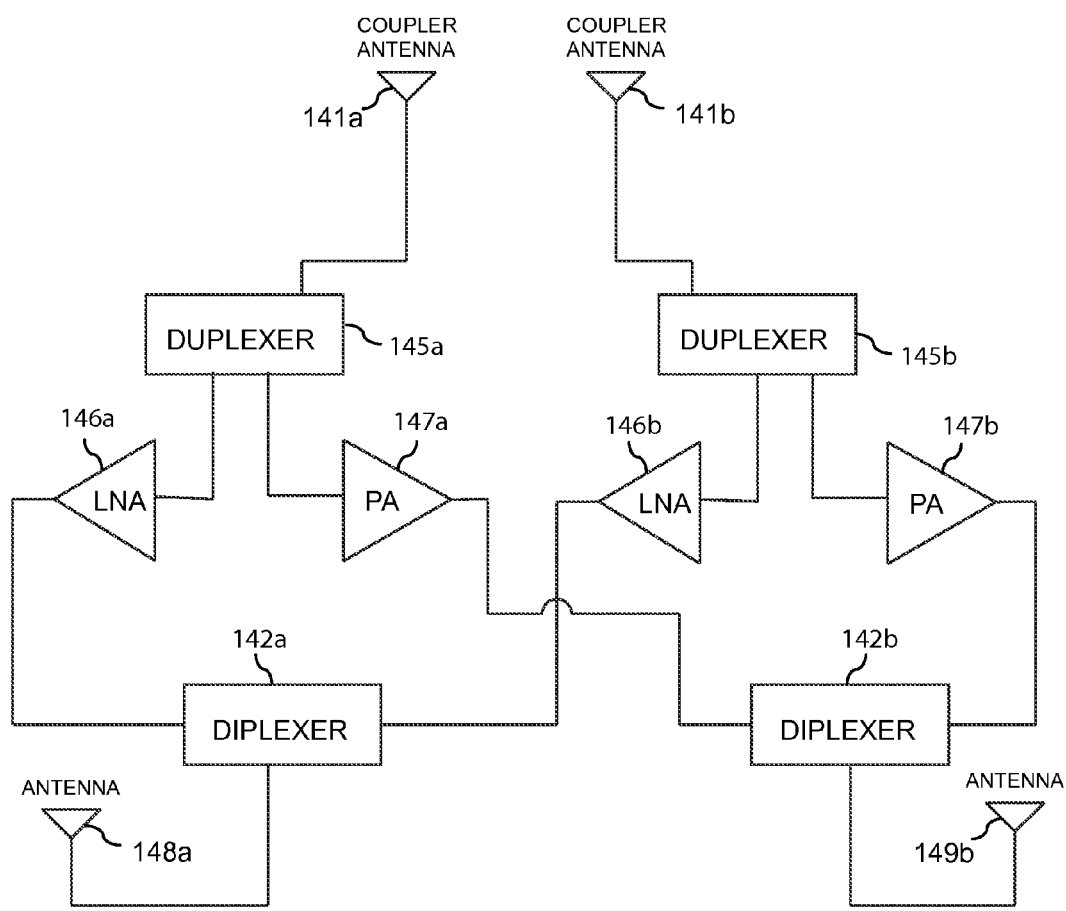
FIG. 14 illustrates a circuit topology incorporating a first coupling antenna for low band frequencies, a second coupling antenna for high band frequencies, two duplexers, two diplexers, and two repeating elements, wherein transmission at both low and high band frequencies are performed by one of the repeating elements, and reception at low and high band frequencies are performed by the second repeating element.

FIG. 14 illustrates yet another adaptive repeater system according to certain embodiments of the invention wherein a first coupling element and second coupling element are connected to a repeater circuit adapted for isolation of HF and LF transmit and receive sections, the repeater circuit being further connected to a dual resonance transmit antenna and a dual resonance receive antenna. The first coupling element 141a is tuned to operate at a HF band, and is connected to HF duplexer 145a for isolation of transmit and receive signal components. HF duplexer 145a is further connected to a HF transmit section and a HF receive section. The HF transmit section comprises a PA 147a. The HF receive section comprises a LNA 146a. The second coupling element 141b is tuned to operate at a LF band, and is connected to a LF duplexer 145b. LF duplexer 145b is further connected to a LF transmit section and a LF receive section. The LF transmit section comprises a PA 147b. The LF receive section comprises a LNA 146b. The HF and LF transmit sections are combined at a transmit diplexer 142b, which is connected to a dual resonance transmit antenna 149b. The HF and LF receive sections are combined at a receive diplexer 142a, which is further connected to a dual resonance receive antenna 148a.

Figure 15:
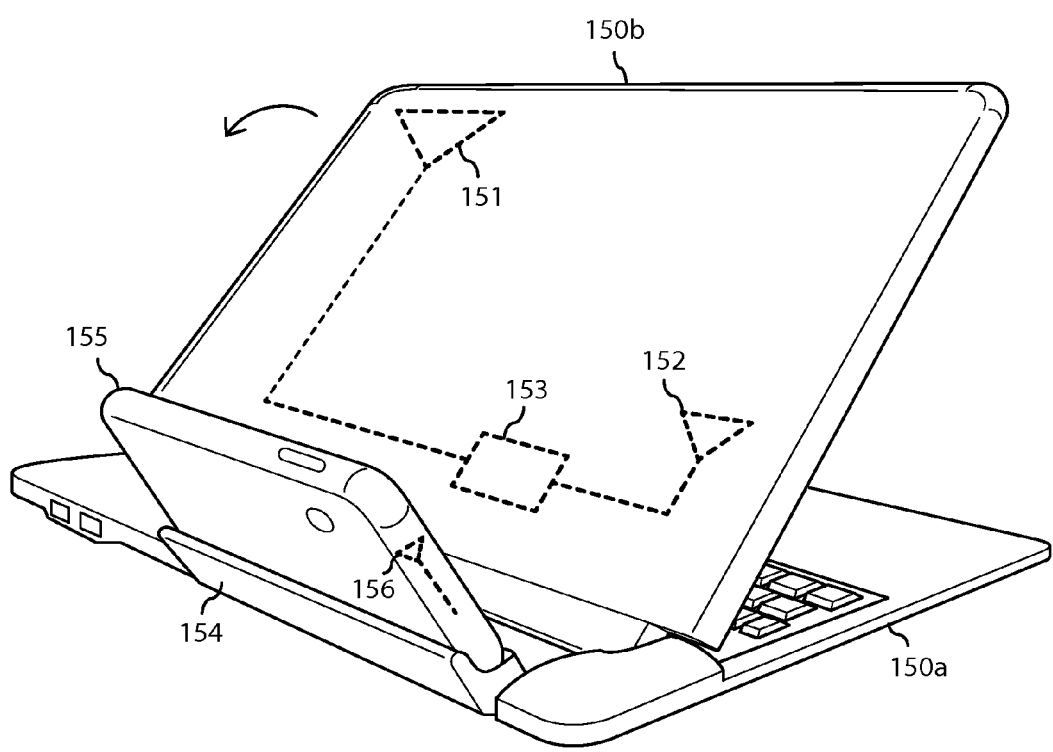
FIG. 15 illustrates one embodiment of the invention, wherein a host device includes a laptop display and keyboard adapted to partially receive a wireless communications device such as a mobile phone, the host includes an adaptive transceiver system including a coupling element, a repeating element, and an adaptive repeater circuit disposed therebetween, the wireless communications device includes an embedded antenna, wherein the coupling antenna of the host device is disposed in proximity to the embedded antenna of the received wireless communications device.

FIG. 15 illustrates an example of a laptop host device having an expanded screen portion 150b and keyboard portion 150a. The host device comprises an adaptive repeater system according to an embodiment of the invention, wherein a coupling element 152 is connected to a repeater circuit 153, the repeater circuit being further connected to a repeating element 151. The host device comprises a wireless communications device dock 154 for at least partially receiving a wireless communications device 155. The wireless communications device 155 comprises at least one embedded antenna 156 for which the coupling element 152 of the repeater system is positioned near. The host device comprising a repeater system is adapted to enhance the communications performance of the overall system (host and device).

For purposes of this invention, the terms coupling element, first coupling element, second coupling element, HF coupling element, LF coupling element, and dual resonance coupling element each refer to an antenna element designed to couple with a wireless communications device when placed in proximity with, or at least partially attached to, a host device.

The terms antenna repeating element, repeating antenna, repeating element, HF transmit antenna, LF transmit antenna, HF receive antenna, LF receive antenna each refer to an antenna element of the repeater system for communicating with a wireless network.

The invention is not intended to be limited with respect to any particular antenna element, and any antenna element known in the art can be incorporated as a coupling or repeating element with minor testing, tuning, and adjustment using methods known to those having skill in the art. However, certain antennas have been utilized by the inventors and have shown optimum performance characteristics, such as single resonance and dual resonance isolated magnetic dipole elements as described in the prior art, for example those antennas described in U.S. patent application Ser. No. 12/043,090, the entire contents of which are hereby incorporated by reference.

The above examples are set forth for illustrative purposes and are not intended to limit the spirit and scope of the invention. One having skill in the art will recognize that certain deviations from the aforementioned examples can be created which substantially perform the same functions and obtain similar results.

The invention claimed is:

1. An adaptive transceiver and antenna system, comprising:
   a host device configured to engage a wireless communication device by physical attachment or nested coupling therebetween, the host device comprising:
      at least one coupling element adapted for positioning adjacent to one or more embedded antennas of the wireless communications device when engaged with the host;
      a repeater circuit comprising at least one transmit section and at least one receive section, each of said at least one transmit sections comprising a power amplifier, each of said at least one receive sections comprising a low noise amplifier, said repeater circuit being connected to said at least one coupling element at a first end, said first end comprising one or more of: a duplexer and a diplexer;

at least one repeating element, said at least one repeating element being connected to said repeater circuit at a second end, said second end comprising one or more of: a duplexer and a diplexer; and
a band detection and control module adapted to actively modulate one or more of: power amplifier gain and low noise amplifier gain for improving communication link performance.

2. The adaptive transceiver and antenna system of claim 1, further comprising first switch at said first end, a second switch at said second end, and a transmission path therebetween such that the system is adapted to bypass said repeater circuit.

3. The adaptive transceiver and antenna system of claim 1, said band detection and control module further comprising an adaptive algorithm for dynamically adjusting antenna performance.

4. The adaptive transceiver and antenna system of claim 1, comprising a first repeating element and a second repeating element, each of said first and second repeating elements being connected to said repeater circuit at said second end.

5. The adaptive transceiver and antenna system of claim 4, said first repeating element being connected to said transmit section and said second repeating element being connected to said receive section.

6. The adaptive transceiver and antenna system of claim 1, said repeater circuit comprising a low frequency receive section and a high frequency receive section, said receive sections each being connected to a receive diplexer at a first end.

7. The adaptive transceiver and antenna system of claim 6, said at least one repeating element comprising a low frequency receive antenna connected to said low frequency receive section, and a high frequency receive antenna connected to said high frequency receive section.

8. The adaptive transceiver and antenna system of claim 6, further comprising a dual resonance receive antenna, said dual resonance receive antenna capable of operation at low and high frequencies.

9. The adaptive transceiver and antenna system of claim 6, said at least one repeating element further comprising a low frequency transmit section and a high frequency transmit section, said transmit sections each being connected to a transmit diplexer at a first end.

10. The adaptive transceiver and antenna system of claim 9, said at least one repeating element further comprising a low frequency transmit antenna connected to said low frequency transmit section, and a high frequency transmit antenna connected to said high frequency receive section.

11. The adaptive transceiver and antenna system of claim 9, said at least one repeating element further comprising a dual resonance transmit antenna, said dual resonance transmit antenna capable of operation at low and high frequencies.

12. The adaptive transceiver and antenna system of claim 1, further comprising one or more proximity sensors, said proximity sensors connected to said band detection and control module and adapted to detect a use case for configuring antenna performance.

13. The adaptive transceiver and antenna system of claim 12, said proximity sensors adapted to adjust one or more of: specific absorption rate and hearing aid compatibility.

14. The adaptive transceiver and antenna system of claim 1, said coupling element further connected to one or more of: a directional coupler, Wilkinson power divider, or hybrid thereof for providing isolation between said receive and transmit sections.

15. The adaptive transceiver and antenna system of claim 1, said repeater circuit comprising a low frequency section and a high frequency section.

16. The adaptive transceiver and antenna system of claim 15, each of said low and high frequency sections being connected to a frequency diplexer at a first end.

17. The adaptive transceiver and antenna system of claim 16, said low frequency section further comprising a low frequency transmit section and a low frequency receive section, each of said low frequency transmit and receive sections being connected to a duplexer for separating low frequency transmit and receive signals.

18. The adaptive transceiver and antenna system of claim 16, said high frequency section further comprising a high frequency transmit section and a high frequency receive section, each of said high frequency transmit and receive sections being connected to a duplexer for separating high frequency transmit and receive signals.

19. The adaptive transceiver and antenna system of claim 15, said low frequency section being connected to a first coupling element, said first coupling element being tuned to receve low frequency signals emitted from said wireless device.

20. The adaptive transceiver and antenna system of claim 15, said high frequency section being connected to a second coupling element, said second coupling element being tuned to receive high frequency signals emitted from said wireless device.

21. The adaptive transceiver and antenna system of claim 1, said at least one repeating element comprising a first dual resonance antenna adapted for transmit operation at low and high frequency bands.

22. The adaptive transceiver and antenna system of claim 21, said at least one repeating element further comprising a second dual resonance antenna adapted for receive operation at low and high frequency bands.

* * * * *